Figure 1:
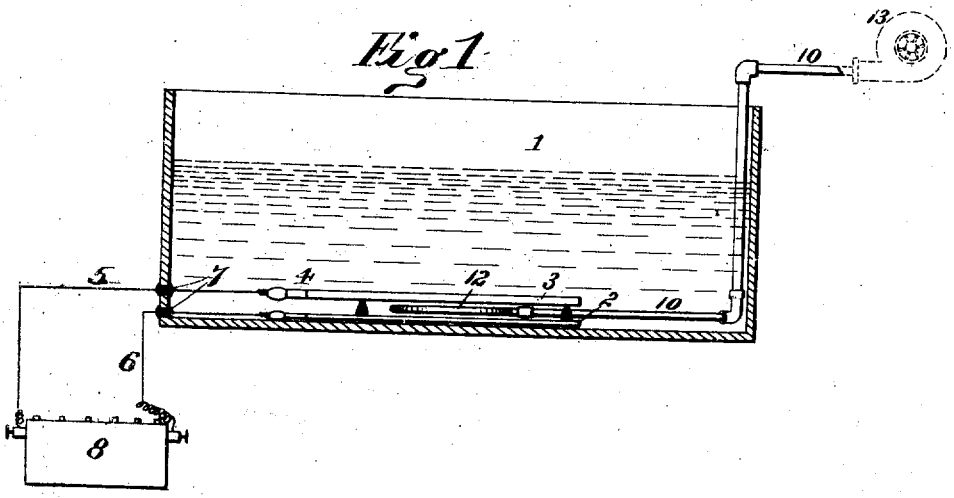

A. E. WOOLF.

Assignor, by mesne assignments, to R. WOOLF & T. J. MONTGOMERY.

PROCESS OF AND APPARATUS FOR BLEACHING BY ELECTROLYSIS.

No. 11,244. Reissued June 7, 1892.

Witnesses
C. C. Burdine
H. Hume Clendenin

Inventor
Albert E. Woolf
per Alexander G. Du Bois
Attorney

UNITED STATES PATENT OFFICE.

ALBERT E. WOOLF, OF NEW YORK, N. Y., ASSIGNOR, BY MESNE ASSIGNMENTS, TO ROSAMOND WOOLF AND THOMAS J. MONTGOMERY, OF SAME PLACE.

PROCESS OF AND APPARATUS FOR BLEACHING BY ELECTROLYSIS.

SPECIFICATION forming part of Reissued Letters Patent No. 11,244, dated June 7, 1892.

Original No. 471,464, dated March 22, 1892. Application for reissue filed May 5, 1892. Serial No. 431,965. Patented in England February 6, 1892, No. 23,329.

*To all whom it may concern:*

Be it known that I, ALBERT E. WOOLF, a citizen of the United States, residing at New York, in the county and State of New York, have invented new and useful Improvements in Processes of and Apparatus for Bleaching by Electrolysis, (for which I have obtained British Patent No. 23,329, dated February 6, 1892,) of which the following is a specification.

My invention relates to processes and apparatus for bleaching textile and other fabrics, tissues, and materials.

The object of my invention is to provide a process in which sea-water containing the desired reagents is employed as an electrolyte, and in which one step consists in the introduction of atmospheric air into the electrolyte, whereby the bleaching action of the products of electrolysis is intensified, such intensified action being caused by the oxygen present and a portion thereof being converted into ozone, whereby I am enabled to produce better results at less expense and in less time than has heretofore been practicable; also, to secure substantially uniform results in a series of successive bleaching operations.

It is my object, also, to provide an electrolytic bleaching process, one step of which consists in driving atmospheric air or a suitable gas or gases through or into the electric field between the electrodes, whereby a greater or less quantity of ozone is produced, and the oxidizing power of the ozone in the presence of chlorine materially aiding the action of the latter, expediting the process, and enabling me to secure much better results.

Another object of my invention is to provide an electrolytic apparatus for bleaching purposes, in which a volume of air or other suitable gas or gaseous compound shall be caused to traverse the electric field by being introduced between the electrodes, which are perforated to diffuse it and permit ready passage from the electric field between the electrodes, thus producing a more or less complete decomposition, by which oxygen and ozone are produced, thereby forming an oxygenated compound of chlorine, which possesses increased bleaching power without detriment to the substances operated upon.

Another object of my invention is to provide a process of the character named, by which the products of electrolysis of sea-water or other fluid compounds shall be employed in their nascent state.

Another object is to provide a novel form, construction, and arrangement of electrodes in my bleaching process, as pointed out below. The electrodes are placed near together to reduce resistance of the electrolyte, and consequently reducing the voltage of pressure. They are also placed in the same vat or tank with the materials to be bleached, thereby subjecting such material to the bleaching action of gases in the nascent state and securing improved results. My positive electrode is preferably made of platinum, whereby the deposit of carbon particles on the material being bleached (which occurs when both electrodes are of carbon) is avoided and improved results secured.

My invention consists, to these ends, in the art, method, or process hereinafter fully explained and in the apparatus to be described as one of many convenient forms of mechanical organizations by which said process may be conveniently practiced, said process and apparatus being also particularly pointed out in the claims, which conclude this specification.

To enable others skilled in the art to understand my said invention and to practice said process, as well as to make, construct, and use apparatus suitable for such purpose, I will describe said invention in detail, reference being had to the accompanying drawings, in which a preferred form of apparatus is shown.

Figure 2:
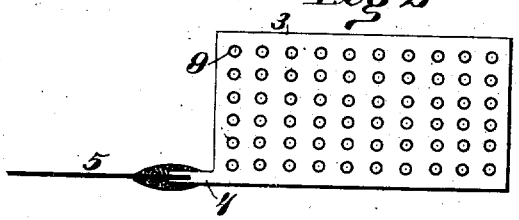
Figure 3:
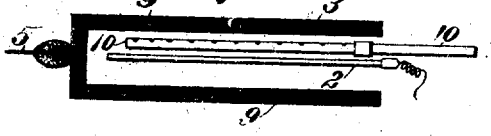
Figure 4:
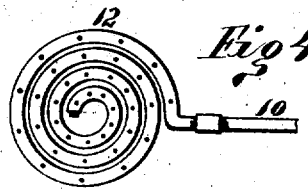

Figure 1 is a vertical section, partly in elevation, showing said apparatus. Fig. 2 is a detail view of one of the electrodes removed from the apparatus. Fig. 3 is a partial vertical section showing a substitute construction. Fig. 4 is a detail view of one form of the air-conduit.

In the said drawings the reference-numeral 1 indicates any suitable form of vat or receiving-tank constructed of any material suitable for the purpose. I may use any of the known forms of vat or I may employ special constructions; but my invention is well adapted to use with the vats or receiving-tanks of any familiar form, which I may modify in some particulars, as hereinafter pointed out. Within this receiving-tank I arrange electrodes 2 and 3, the first being the positive element, formed preferably of platinum, and the latter the negative element, usually made of carbon. To utilize both surfaces of the positive electrode, I prefer to place it between two negative electrodes 3, as shown in Fig. 3. I may employ, however, electrodes of any other kind and of any approved material. From one end of each electrode projects a terminal 4, preferably, though not necessarily, integral with the electrode. These terminals provide convenient attachments for the denuded ends of the conductors or cable-wires 5 and 6, which are usually solder-jointed to said terminals, but may be fastened in any preferred form. The joint is then covered by any protector capable of resisting the corrosive action of the products of electrolysis—such, for example, as gas-proof paint, paraffine, adhesive tape, or other suitable material. The wires are led out of the receiving-tank through the side or end thereof, and for this purpose they may be packed through openings in the wall by any effective means—such as an elastic plug 7—for which any preferred device may be substituted. The wires 5 and 6 are led to the poles of a storage-battery 8 of any approved type, the cells being of such number and so constructed as to yield the electric energy required for various sides of electrodes, or for the various capacities of the tanks, or in proportion to the work to be done.

It will be understood that I may employ other sources of electric energy—such, for example, as a dynamo; but I prefer the storage-battery, because of the ease with which its yield may be regulated in accordance with the requirements of any particular case.

The negative electrodes 3 are usually provided with perforations 9, formed at suitable intervals and of any suitable size. I prefer, however, to adopt such a number and diameter of these perforations as shall not materially diminish the surface area of the electrode, though by somewhat increasing the thickness of the latter and properly proportioning the diameter of the openings 9 a limited increase in the efficient surface may be secured. The purpose of this construction, giving irregular surfaces, is to permit the passage of the gases produced by decomposition of the menstruum or fluid composing the electrolyte and to avoid obstructing the passage of the gas-bubbles in a material degree by the presence of an imperforate electrode. It will readily be understood that this construction may be varied in many ways so familiar to those skilled in the art as to require no specific mention.

The reference-numeral 10 indicates a conduit or tube of any suitable kind by which atmospheric air may be conveyed. This pipe may be composed wholly or in part of glass, hard rubber, or other material capable of resisting the action of the electrolyte or of the products of electrolytic action. Said tube may, however, be constructed in several parts of two or more different materials of the kind mentioned. It leads to or forms part, as the case may be, of a discharging-terminal 12 of any suitable form and provided with air-exits. While I have shown this air conduit or tube entering the bleaching-vat from the top thereof, I may carry it horizontally through the side or end wall or through the bottom.

The conduit or tube 10 is connected with any form of air-forcing device, indicated conventionally by the numeral 13, as I do not consider it necessary to illustrate any particular type of such mechanism. The air flows from the terminal into the space between the electrodes 2 and 3, where the magnetic force is at its maximum. I may also use mechanical stirrers either alone or in conjunction with the air.

In some cases it is desirable to cause the air to traverse the electric field, where it may be more or less affected by the electrical energy, and in this case a terminal 12 of suitable form is inserted between the electrodes 2 and 3. This arrangement, however, is not essential, and good results are secured when the air is introduced into the electrolyte at other points.

The bleaching vat or tank 1 is filled to the usual point with sea-water in its natural state, and the fabrics, fibers, tissues, or materials to be operated upon are placed therein, after which the circuit of the battery or other source of energy is closed. Electrolysis is thereby established between the poles, the fluid is decomposed, the sodium, magnesium, and potassium chlorides are caused to part with their chlorine, which is liberated at the positive pole, and by forming the latter of platinum the liberation of ozone and other gases by the decomposition of the water does not affect the plate, and an oxygenated and ozonized chlorine compound is formed at said pole which possesses marked bleaching qualities. It seems, also, that the action of the ozone may be more or less intensified by the introduction of the air-current between the electrodes in such manner that it may traverse the electric field and suffer more or less conversion.

Instead of a solid platinum electrode, I may employ an electrode plated or coated with said metal; but I may substitute any other electrode of any approved material for either the platinum or the carbon electrode shown.

I use sea-water at a specific gravity of about 1.028 or 4° Baumé, or I may use rock-salt or sea-salt dissolved at substantially the density named. I may, however, vary the density to conform to the requirements of the material to be acted upon.

Heretofore bleaching processes have been practiced in which chlorine has been liberated from solutions of chloride of magnesium by electrolysis, and I make no claim to such process.

It may be found convenient to use more than one group of electrodes, since in large vats they may be preferable to a single group of large electrodes. I regard this as a mere equivalent for the arrangement shown.

What I claim is—

1. In the art of bleaching, the process set forth, which consists in submitting sea-water to electrolysis, forcing atmospheric air into the electrolyte, discharging the same between the electrodes, and submitting the materials to be bleached to the action of the products of electrolysis in the same vat or tank, substantially as specified.

2. In the art of bleaching, the process set forth, which consists in submitting sea-water to electrolysis, forcing atmospheric air into the electrolyte, discharging the same between the electrodes, and submitting the materials to be bleached to the action of the products of electrolysis in the same vat or tank during agitation of the electrolyte, substantially as specified.

3. In a bleaching apparatus, the combination, with a vat or receiving-tank containing an electrolyte, of positive and negative electrodes arranged therein, a source of electric energy connected therewith, an air-forcing device, and an air conduit or tube entering the electrolyte and having a discharging-terminal lying between the electrodes, substantially as described.

4. In a bleaching apparatus, the combination, with a vat or tank, of a positive electrode and a perforated negative electrode connected to wires entering the tank, a storage-battery in circuit with said electrodes, an air-forcing device, and an air conduit or tube entering the tank and having a terminal provided with air-exits discharging between the electrodes, substantially as described.

5. The combination, with a vat or tank containing an electrolyte composed of sea-water or equivalent saline solution and having the materials to be bleached immersed therein, of a positive electrode, a negative electrode having irregular surfaces placed close together or side by side, a source of electrical energy in circuit therewith, and means for admitting air between the electrodes, substantially as described.

6. The combination, with a vat or tank containing an electrolyte composed of sea-water or equivalent saline solution, of a positive electrode composed of platinum and a negative electrode composed of carbon, both immersed in the electrolyte, a source of electrical energy in circuit with said electrodes, and means for causing the electrolyte to circulate between the electrodes and for agitating the electrolyte, substantially as described.

ALBERT E. WOOLF.

Witnesses:
ROBERT DONLY,
W. S. ROMME.